(12) United States Patent
Rosen

(10) Patent No.: US 6,510,049 B2
(45) Date of Patent: Jan. 21, 2003

(54) ADJUSTABLE DISPLAY MONITOR UNIT

(75) Inventor: John B. Rosen, Eugene, OR (US)

(73) Assignee: Rosen Products LLC, Eugene, OR (US)

(*) Notice: Subject to any disclaimer, the term of this patent is extended or adjusted under 35 U.S.C. 154(b) by 180 days.

(21) Appl. No.: 09/746,023

(22) Filed: Dec. 21, 2000

(65) Prior Publication Data

US 2001/0048584 A1 Dec. 6, 2001

Related U.S. Application Data

(60) Provisional application No. 60/174,970, filed on Jan. 6, 2000.

(51) Int. Cl.$^7$ .............................. G06F 1/16; A47F 5/00
(52) U.S. Cl. ...................... 361/681; 248/919; D14/336; D14/377; 312/7.2; 312/223.1
(58) Field of Search ................................ 361/681, 682, 361/683; 248/917–924; D14/300–461; 312/7.2, 223.1, 223.2

(56) References Cited

U.S. PATENT DOCUMENTS

| | | | | |
|---|---|---|---|---|
| 4,640,485 A | * | 2/1987 | Day et al. ................... | 248/920 |
| 4,814,759 A | * | 3/1989 | Gombrich et al. .......... | 361/681 |
| 4,919,387 A | * | 4/1990 | Sampson .................. | 248/349.1 |
| 5,024,415 A | * | 6/1991 | Purens ..................... | 248/349.1 |
| 5,206,790 A | * | 4/1993 | Thomas et al. ............. | 361/681 |
| 6,189,842 B1 | * | 2/2001 | Bergeron Gull et al. ..... | 248/919 |
| 6,275,376 B1 | * | 8/2001 | Moon ......................... | 361/683 |

\* cited by examiner

Primary Examiner—Darren Schuberg
Assistant Examiner—Lisa Lea-Edmonds
(74) Attorney, Agent, or Firm—Kolisch Hartwell, P.C.

(57) ABSTRACT

An adjustable multi-positional display monitor for accommodating varied viewing positions. The display unit includes a swivel portion, a pivot portion and a screen. The swivel portion is rotatable relative to a reference surface about a first axis, which extends through the reference surface. The pivot portion has a proximal and distal region, the proximal region pivotally coupled to the swivel portion to accommodate pivot of the pivot portion relative to the swivel portion about a second axis which is normal to the first axis. The distal region is associated with a screen which is rotatable about a third axis which extends though a planar viewing surface of the screen so that the screen can be positioned for viewing from an upright, inverted and recumbent position regardless of the orientation of the reference surface.

8 Claims, 4 Drawing Sheets

ADJUSTABLE DISPLAY MONITOR UNIT

CROSS-REFERENCE TO RELATED APPLICATION

This application claims priority from U.S. Provisional Patent Application Ser. No. 60/174,970, filed Jan. 6, 2000 for a MULTI-POSITION DISPLAY MONITOR.

TECHNICAL FIELD

The present invention relates generally to display monitors, and more particularly, to display monitors which can be selectively configured for viewing, regardless of the mounting orientation.

BACKGROUND OF THE INVENTION

Modern display monitors are found throughout the home and office. The monitors are found connected to computers, televisions, digital video display machines, videocassette recorders, security devices and sound devices. The variety of uses has increased the number of monitors found in both home and office settings. In the home setting, monitors are found in virtually every room of many houses, including living rooms, family rooms, dining rooms, bedrooms, bathrooms, kitchens and even garages. The varied environments require a versatile monitor that is adaptable to the setting and which accommodates different viewing orientations.

Historically, monitors, used for viewing entertainment content, have been large cathode ray tube devices and thus typically have been heavy and bulky. These monitors require a large amount of space and a flat surface on which to be placed. Many times they are the focal point of a room. Computer monitors, in contrast, may employ an adjustable screen where a user can reposition the screen to some degree to accommodate a viewer's position. However, many of these monitors are still large and bulky, and require sufficient table space on which to place the monitor. With the emergence of flat panel display monitors, less space is needed to accommodate monitors, and hence, there has been increased versatility in the use and placement of monitors.

To meet the needs of today's display monitor users, the display monitors need to be adaptable. However, the adjustability of known monitors generally is limited by the monitor's primary mounting orientation. For example, an overhead-mounting monitor typically is specially designed for ceiling or overhead mounting, such that it lacks the versatility to provide adequate viewing when mounted upright on a table or on a wall. More particularly, known display monitors lack the adjustability necessary for viewing the monitor from alternative viewer orientations, such as from a recumbent position.

To increase monitor adjustability, various swivels and pivots have been added to monitor units. These pivots and swivels often allow adjustability in two axes, namely an axis to accommodate tilting a table top mounted display screen upwards and downwards, and an axis to accommodate rotating the table top mounted display screen right and left. However, the pivot points are generally limited and hence do not adequately provide a multi-positional monitor for all possible viewer orientations.

Articulated arm extensions have been utilized to increase adjustability of display monitors. However, these extensions themselves are often large and bulky, and the joints of such extensions typically require springs to maintain the position of the arm in a particular conformation. Positioning of the arm may become difficult if the springs wear. Moreover, a single arm extension may lack lateral stability.

An alternative response to the need for providing a display monitor that can be viewed from variable positions involves provision of a monitor that changes image orientation. Such a display monitor would provide an option to change the image displayed from a portrait view to a landscape view. This change in image orientation is intended to accommodate viewing from a reclining position, such as when the viewer is resting with his/her head facing to one side or the other. However, these image orientation changes may distort the picture or frame the picture such that it does not fit the monitor viewing area.

The adaptability of display monitors also extends to the storing of the monitors when not in use. The less obtrusive the monitor is, the more consumer marketable the monitor may be. By having both a deployed and stowed position, monitors can be kept out of sight when not in use. Such stowable monitors are found on airplanes as well as in automobiles. However, the monitors are generally only pivotal between a stowed position and a single deployed position, with little or no adjustability once deployed. Moreover, these monitors usually require a specially designed recessed area in which to mount the monitor and are not adaptable to more varied uses.

SUMMARY OF THE INVENTION

The present disclosure provides for a multi-positional, adjustable, stowable display monitor unit that accommodates varied viewing orientations. In the depicted embodiment, the invention includes a display monitor unit mountable on a reference surface, the display monitor unit having a base, an arm and a screen. The base rotates relative to the reference surface about a first axis that extends through the reference surface, while the arm rotates about a second axis that is normal to the first axis. The arm may have a proximal region and a distal region, the arm being attached to the base and the distal region being attached to the screen. The screen rotates about a third axis which extends though the planar viewing surface of the screen such that the screen can be viewed selectively from an upright, inverted and recumbent position, regardless of the orientation of the reference surface.

The base may be circular, with a recessed perimeter portion, and the arm may be an arcuate arm with opposing ends and a crest such that the ends of the arcuate arm may be attached to the circular base for pivot between a stowed position and a deployed position. When in the stowed position, the arm may fold flush into the recessed perimeter portion of the circular base.

These and additional objects and advantages of the present invention will be more readily understood after consideration of the drawings and the detailed description of the preferred embodiment which follows.

DETAILED DESCRIPTION OF THE PREFERRED EMBODIMENT AND BEST MODE OF CARRYING OUT THE INVENTION

Figure 1:
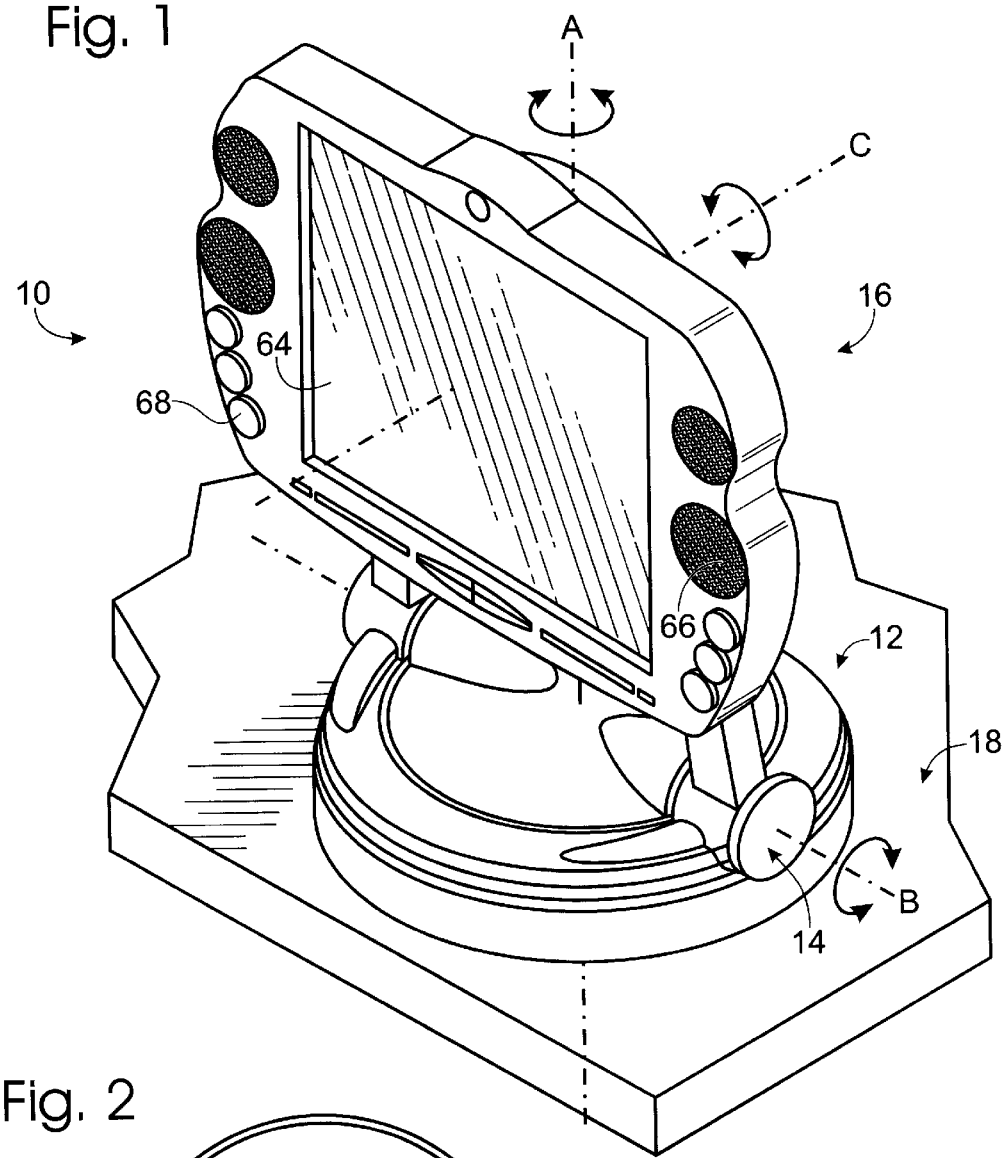
FIG. 1 is an isometric view of a display monitor unit constructed in accordance with the present invention.

Referring initially to FIG. 1, a display monitor unit is shown generally at 10, the display monitor unit including a base or swivel portion 12, an arm or pivot portion 14, and a rotatable display screen 16. As described in the following disclosure, the base, the arm and the display screen are rotatable about three separate axes, axis A, axis B, and axis C, to accommodate viewing of the display screen regardless of a viewer's orientation to the display monitor unit.

Figure 3:
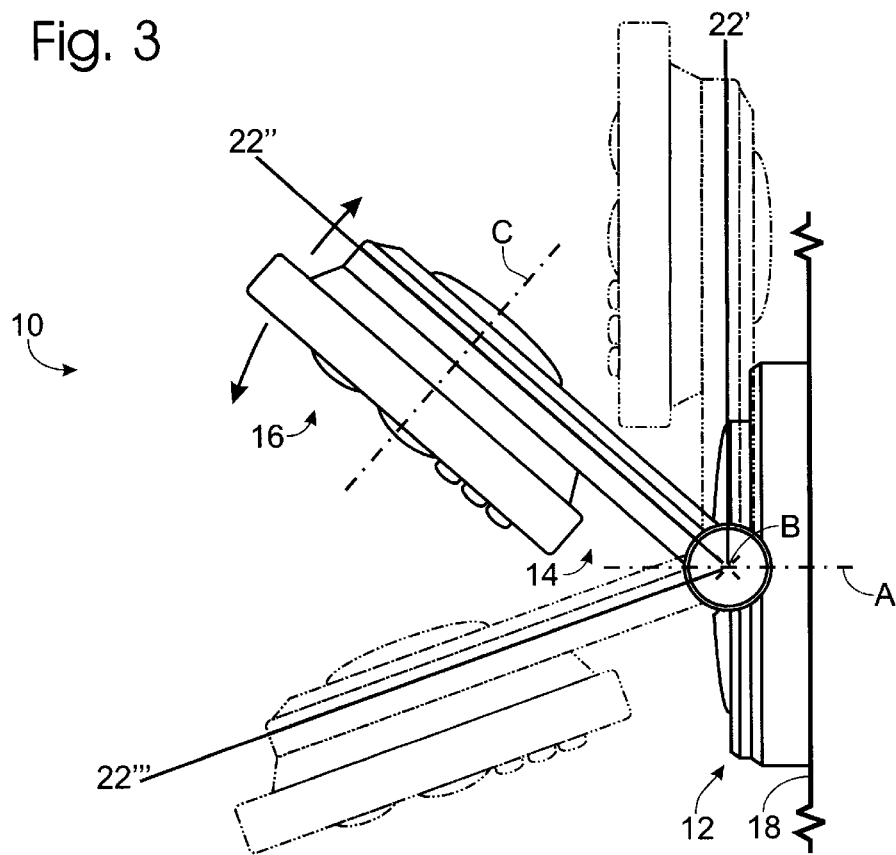
FIG. 3 is a side view of the display monitor unit of FIG. 1 mounted to a wall showing pivotal motion of an arm of the display monitor unit.
Figure 4:
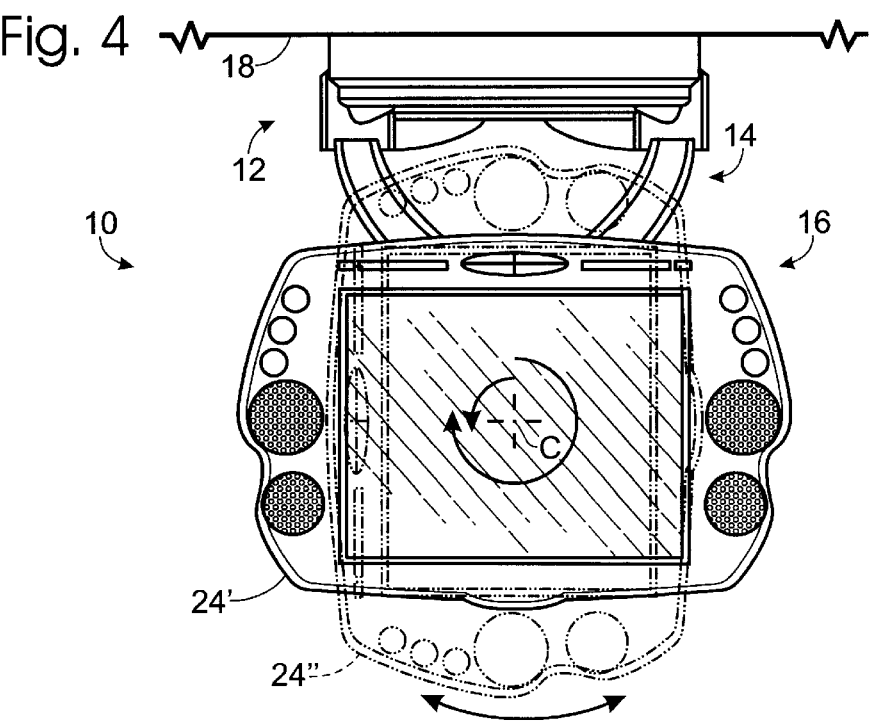
FIG. 4 is a front view of the display monitor unit of FIG. 1 mounted to a ceiling and showing rotation of a screen of the display monitor unit.

Display monitor unit 10 can be mounted on a reference surface 18. The reference surface, as shown in FIG. 1, is a horizontal top surface, such as a table. Alternatively, the reference surface may be a vertical surface such as a wall (as shown in FIG. 3), or an overhead surface such as a ceiling (as shown in FIG. 4). Moreover, the reference surface may be at any angle or inclination, such that the display monitor unit may be mounted in a horizontal, vertical, angled or upside down orientation. The term, reference surface, herein, shall be used generally to refer to any mounting surface of the display monitor unit of any orientation.

The base or swivel portion 12 is a generally planar structure mounted to the reference surface with conventional fasteners. The base allows for rotation of the display monitor unit about axis A, which extends perpendicularly through reference surface 18. Regardless of the orientation of the reference surface, the base is rotatable relative to the reference surface.

Figure 2:
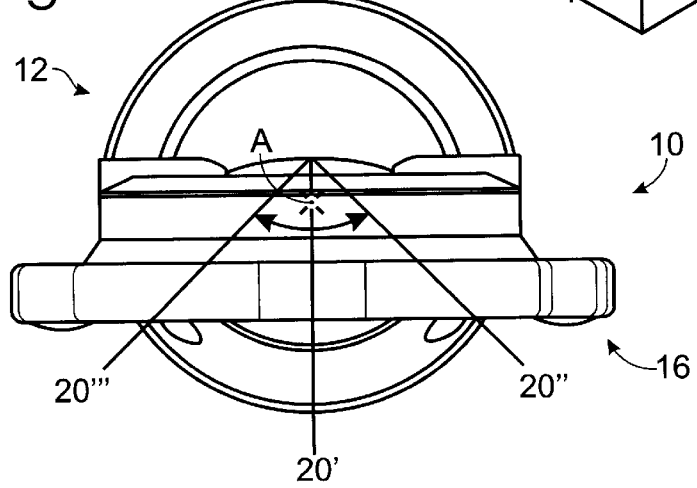
FIG. 2 is an overhead view of the display monitor unit of FIG. 1 showing rotation of a base of the display monitor unit.

FIG. 2 is an overhead view of the display monitor unit of FIG. 1 showing rotation of base 12 of display monitor unit 10 about axis A. As indicated, the base nominally is positioned with display screen 16 facing in a direction 20'. The base may be rotated at least +/−45 degrees about axis A to multiple positions with the display screen facing in directions 20" and 20''', respectively. It will be appreciated that by rotating the base, both the arm and the display screen will be rotated relative to the reference surface. A first base position is defined where the display screen faces in direction 20' as shown in solid lines in FIG. 2. When the base is rotated, for example, 45 degrees counterclockwise, the display screen will face in direction 20'. When the base is rotated 45 degrees clockwise from the first position, the display screen will face in direction 20'''. Typically, the base is adjustable through approximately ninety degrees of rotation. An adjusted or second base position is defined when the display screen faces in direction 20', 20''' or any intermediate direction.

Referring now to FIGS. 1 and 3, it will be appreciated that arm 14 is interposed the base and the screen. FIG. 3 is a side view of display monitor unit 10 showing pivotal motion of arm 14. The arm has both a proximal region and a distal region The proximal region of the arm is attached to the base, while the distal region is attached to the screen. The screen may be adjustably positioned by pivoting the arm about axis B, which is generally parallel to reference surface 18, and is orthogonal to axis A.

The arm is generally pivotal between a stowed position, shown in dashed lines at 22' and a variety of deployed positions, such as those shown at 22" and 22'''. Indicated in FIG. 3, in stowed position 22', arm 14 lies flush against base 12 such that the screen is generally parallel to reference surface 18. As the arm pivots about axis B between stowed position 22' and deployed positions such as 22", 22''', an angle, defined by the distance of the arm from the reference surface, changes. In deployed positions 22", 22''', screen 16 extends away from reference surface 18. Generally, arm 14 pivots about axis B through a range of motion of at least approximately 90 degrees, and more typically approximately 110 degrees.

In the depicted embodiment, arm 14 pivots about axis B through at least a range of motion of 110 degrees from stowed position 22'. Such movement is utilized to accommodate a viewer's orientation so that regardless of the mount of the display monitor unit 10, a viewer may still be able to view the screen. Once positioned, display monitor unit 10 may be locked in a desired position. For example, to prevent arm 14 from collapsing from the desired position, the arm may have conventional locking mechanisms (not shown) for both the stowed and the deployed positions.

Figure 7:
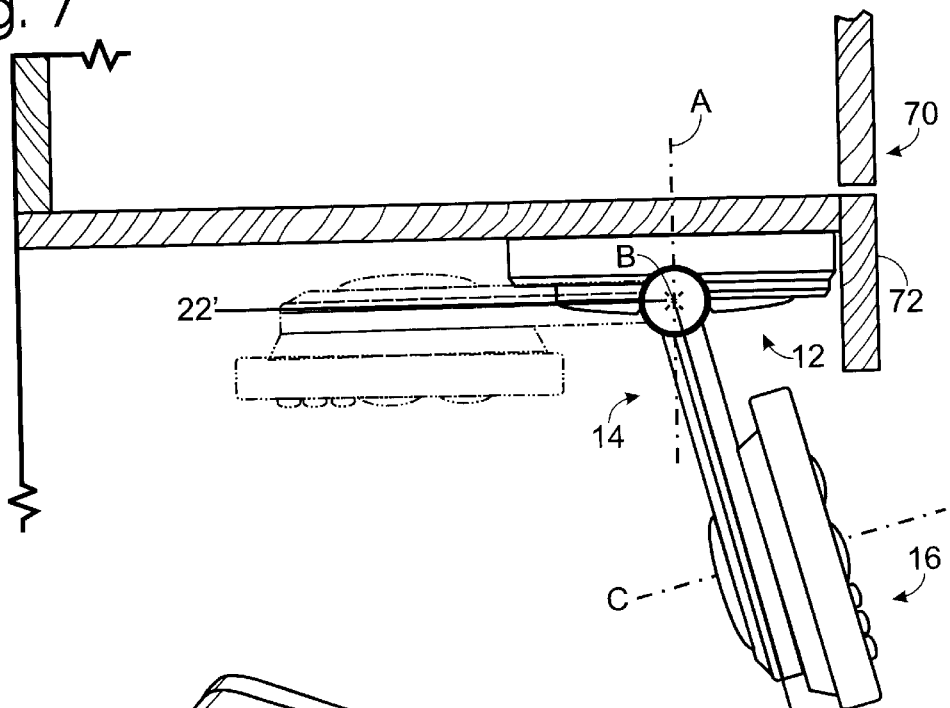
FIG. 7 is a side view of the display monitor unit of FIG. 1 mounted to an under surface of a cabinet behind a cabinet skirt.

Directing one's attention now to FIGS. 1 and 4, screen 16 is attached to a distal region of arm 14. The distal region, it will be appreciated, is represented by a central area of the arc formed by arm 14. FIG. 4, in particular, is a front view of display monitor unit 10 of FIG. 1 mounted to a reference surface 18 and showing rotation of screen 16 about a third axis, C, which extends through the screen, such that the screen can be adjusted to accommodate a viewer's position. Axis C is orthogonal to both axis A and to axis B in FIG. 4. However, as shown in FIG. 7, arm 14 may be positioned such that axis C is not orthogonal to either axis A or axis B.

In the depicted embodiment, as viewed in FIG. 4, screen 16 rotates a total of 360 degrees about axis C. This 360 degree rotation may be accomplished as shown in the depicted embodiment by rotation of the screen 270 degrees in a clockwise direction from the orientation shown in solid lines, and rotation 90 degrees in the counterclockwise direction from the orientation shown. Of course, opposite rotation also would be possible. In FIG. 4, screen 16 is shown in a reference or first screen position, 24'. At a second screen position 24", screen 16 is shown in dashed lines rotated counterclockwise, 90 degrees from the reference position. This rotation permits screen 16 to be oriented to a reclining viewer with his/her head positioned sideways on a pillow or on another generally planar surface. Similarly, screen 16 may be rotated 180 degrees clockwise so that the screen would be inverted relative to the reference position 24'.

Screen rotation about axis C accommodates a viewer by providing an apparent upright screen position relative to the orientation of the viewer. For example, if the screen is inverted 180 degrees from the reference position, where the reference position is upright relative to the room, then the actual screen position would also be inverted relative to the room. However, the screen is in apparent upright screen position to an inverted viewer. Likewise, if the screen is rotated 90 degrees from the reference position, then the screen will be in an apparent upright position to a recumbent viewer.

Figure 5:
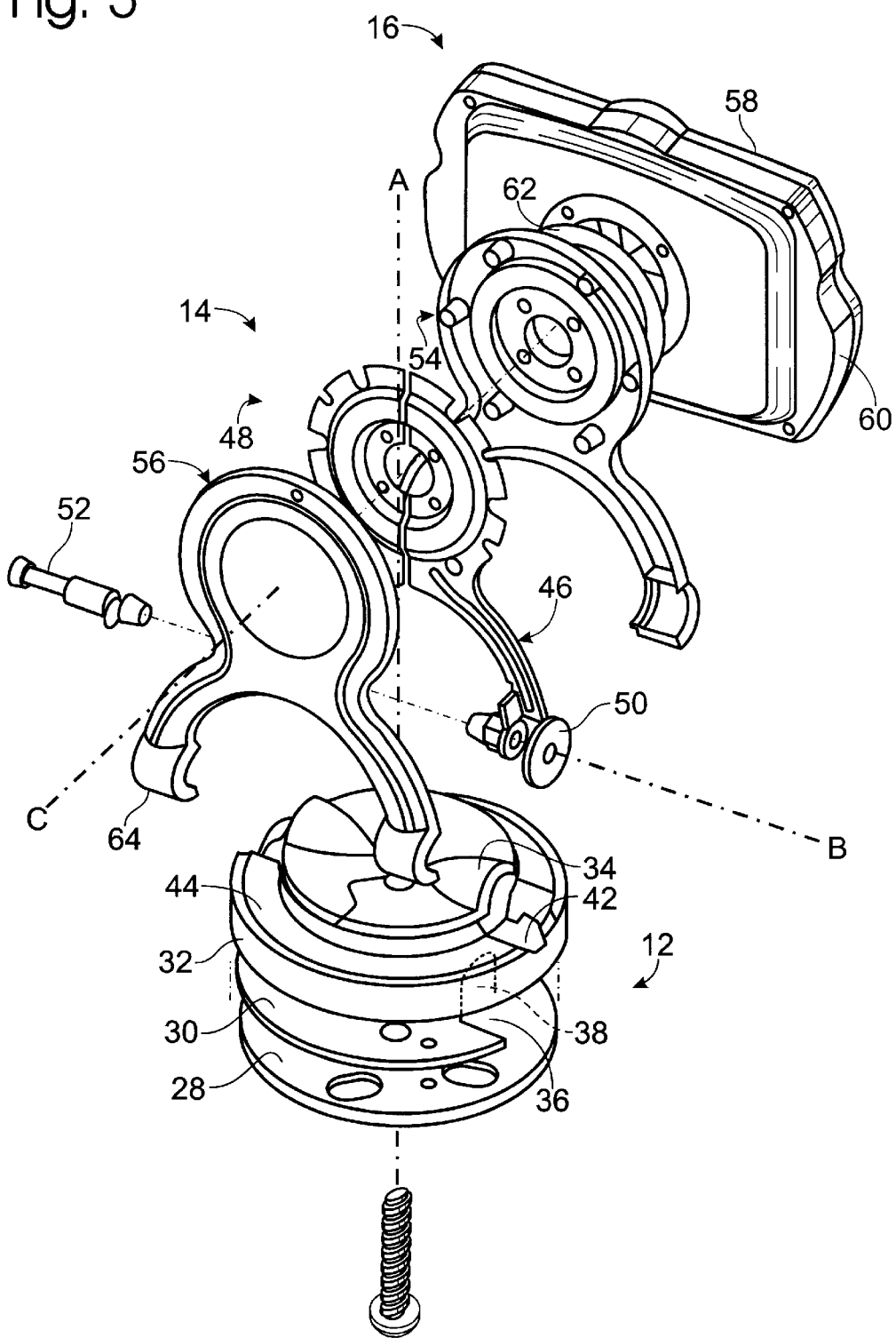
FIG. 5 is an exploded isometric view of the display monitor unit of FIG. 1.
Figure 6:
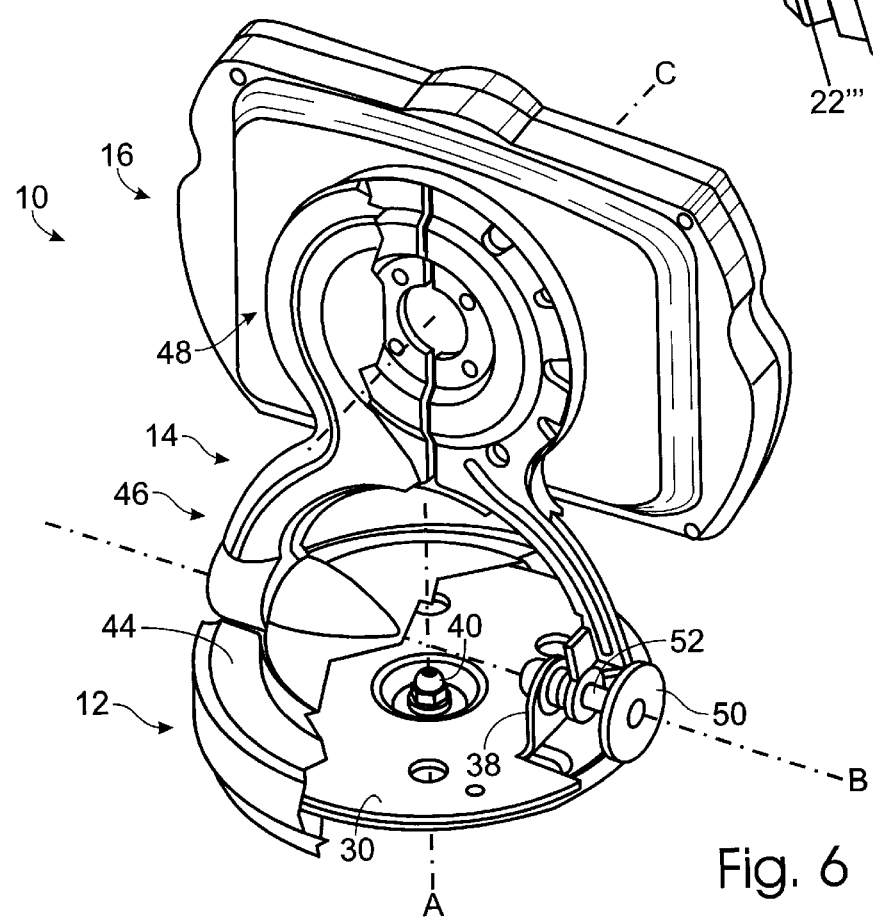
FIG. 6 is a sectional view showing the base and the arm of the display monitor unit of FIG. 1.

The mechanisms for operation of the display monitor unit may be understood upon reference to FIGS. 5 and 6. FIG. 5 is an exploded isometric view of display monitor unit 10 and FIG. 6 is a sectional view showing the base and arm assembly. Each of the three main components, the base, the arm and the screen and their operable parts are described hereafter.

It will be appreciated that a mounting plate may be utilized to secure display monitor unit 10 to reference surface 18. Base 12 is affixed to the mounting plate using conventional couplers. However, it is also contemplated that the base may operate without a mounting plate and, hence, be fixed or secured to the reference surface itself.

Focusing more specifically on base 12 in FIG. 5, it will be seen that the base includes a base bottom 28, an arm support 30, a base top 32 and a base lid 34. In the present embodiment, base bottom 28 takes the form of a circular plate with a hollow center and a raised outside perimeter. The base bottom has mounting holes for screws or other similar fasteners for attachment of the base bottom 28 to reference surface 18 or to a mounting plate.

Interposed base bottom 28 and base top 32 is an arm support 30. Referring to FIGS. 5 and 6, it will be appreciated that arm support 30 is a disk with recessed perimeter sections, as shown at 36, for attachment of arm 14. An arm bracket 38 juts out from arm support 30 to provide a journal for attachment of arm 14. A similar arm bracket extends from the other side of arm support 30, but it is not shown in the drawings.

As best shown in FIG. 6, a pintle 40 extends from base bottom 28 though a hole in the center of arm support 30 so that arm support 30 may rotate about axis A. Pintle 40 extends upwards through the hollow center of the base bottom away from the reference surface. The pinde is aligned with the A axis. The rotation mechanism includes a locking or coupling device such that pintle 40 is secured to base 12. The locking or coupling device may be a locking nut or other similar type of coupler such that the arm support is sandwiched between the base bottom and the locking nut of the pintle and is freely rotatable about the pintle. Since the arm of the display monitor unit is journalled to the arm support brackets, rotation of the arm support about the pintle, thereby allows rotation of arm 14.

Base 12, as shown in the depicted embodiment, includes base top 32 and base lid 34. Base top 30 as shown in FIG. 5, is an annular shroud positioned along the outer perimeter of arm support 30. Arm brackets 38 project through slotted regions 42 on base top 32. Base lid 34 is then secured on top of arm support 30 and base top 32. A recessed perimeter ring 44 is formed on base 12 due to base lid 34 being positioned on the inner rim of base top 32.

Recessed perimeter ring 44 of base 12 functionally serves to allow compact storage of display monitor unit 10 such that when arm 14 is pivoted to the stowed position 22', the arm folds into the recessed perimeter ring. Screen 16 then lies generally parallel to reference surface 18 and the entire display monitor unit 10 has a generally narrow, planar profile.

Referring still to FIGS. 5 and 6, arm 14 as previously described rotates about axis B. In the depicted embodiment, arm 14 takes. the shape of a wishbone. The wishbone arm 14 has a proximal region 46 and a distal region 48 where the proximal region is the region of attachment to base 12, and the distal region is the region of attachment to screen 16. Proximal region 46 of arm 14 is herein described as an arcuate portion.

Arcuate portion 46, described as the proximal region of arm 14, is in the form of an arch, where there are two ends and a crest. The two ends of the arcuate portion are journalled through a coupler 50 to arm brackets 38 of arm support 30 of base 12. The coupler in the depicted embodiment is a pivot pin 52, which lies in the B axis. The pin is inserted through recesses in the end of the arcuate arm and into a recess in arm bracket 38. The pin acts as an axle on which the arm is tightly coupled such that the arm is pivotal between stowed position 22' and deployed positions, 22", 22'''.

The arcuate portion of arm 14 is shaped such that it folds into recessed perimeter ring 44 of base 12. Hence, the screen and arm may be stored where arm 14 rotates about the B axis, between the first stowed position 22' (FIG. 3) and deployed positions, as shown by example at 22", 22'''. In the stowed position, base 12, arm 14 and screen 16 all lay in generally the same plane, a plane parallel to reference surface 18. Arcuate portion 46 of arm 14 when stored lies generally flush against base top 32 of base 12.

The crest of arcuate portion 46 of the depicted embodiment is the attachment point for a mounting ring. The mounting ring is located on distal region 48 of the wishbone arm 14. The mounting ring as depicted is a circular ring that functions to secure the screen to the arm. However, any mounting that operates to couple the screen to the pivotal arm will suffice.

Arm 14 also includes a front arm housing 54 and a rear arm housing 56 as shown in FIG. 5. Both front and rear housing of arm 14 streamline the appearance of the arm. Moreover, front housing 54 is also the interface between arm 14 and screen 16.

Still referring to FIGS. 5 and 6, screen 16 is a rotatable viewing display screen. The screen is attached to the mounting ring on distal region 48 of wishbone arm 14 such that the screen is rotatively coupled to the arm to allow movement about axis C which extends through a front 58 screen housing and rear screen housing 60. The rotation mechanism of the screen about axis C includes a series of washers or plates 62 coupled between screen 16 and the mounting ring. Screen 16 rotates through an upright position, an upside down position and a right and left facing position. Position of the screen is maintained in the embodiment by a detent ring, which temporarily locks the screen in a desired position relative to the arm regardless of the position of the arm or the position of the base.

The screen typically takes the form of a generally thin flat panel display (FPD) such as a liquid crystal display (LCD). Referring back to FIG. 1, the screen includes a viewing surface 64, speakers 66, as well as various audio and video controls 68. The depicted embodiment positions the speakers on either side of the viewing surface, but the speakers could also be above or below the viewing surface. Moreover, the audio and video controls may be positioned elsewhere on display monitor unit 10 or not at all, if some type of remote control device controls the unit. The design and shape of the screen is primarily a function of appearance of the display monitor unit and it is appreciated that other shapes are contemplated.

The display monitor unit may be used as a computer monitor, a television, a security monitor, a game display, or a digital video display. The unit may be a standalone unit or a repeater. Audio, video and power inputs may be contained within the display monitor unit. Alternatively, the audio, video and power inputs may also extend directly to the screen. In the depicted embodiment, the mounting plate has an opening for the audio and power inputs which run through base 12 and into the end of proximal region 46 of arm 14 and up through distal region 48 of arm 14 and into rear screen housing 60 of screen 16. Moreover, base 12 may have a built in antenna or battery power source. Base 12 may also include a recessed plug for a tuner or other device.

Having observed the details of the disclosed invention, attention may now be given to the adaptability of the display monitor unit. As previously described, the display monitor unit allows rotation about three separate axes to accommodate a wide range of viewer orientations. Independent rotation about each axis allows the unit to have a multiple of possible positions. For example, one position may include the combination of base 12 rotated from first base position 20' (FIG. 2) to second base position 20' or 20''' (FIG. 2) and arm 14 rotated from stowed arm position 22' (FIG. 3) to deployed arm position 22" or 22''' (FIG. 3). In another position, base 12 may be rotated from first base position 20' (FIG. 2) to second base position 20' or 20''' (FIG. 2) and screen 16 rotated from first screen position 24' (FIG. 4) to second screen position 24" (FIG. 4). Another possible combination includes arm 14 rotated from stowed arm position 22' (FIG. 3) to deployed arm position 22" or 22''' (FIG. 3) and screen 16 rotated from first screen position 24' (FIG. 4) to second screen position 24" (FIG. 4). As a further example, a combination may include base 12 rotated from first base position 20' (FIG. 2) to second base position 20' or 20''' (FIG. 2), arm 14 rotated from stowed arm position 22' (FIG. 3) to deployed arm position 22" or 22''' (FIG. 3), and screen 16 rotated from first screen position 24' (FIG. 4) to second screen position 24" (FIG. 4). The examples provided are not meant as limiting combinations, but rather illustrations of the adaptability and adjustability of the display monitor unit. Additional intermediate and extended positions are contemplated. Once positioned, the base, arm and screen may be secured to maintain the desired position.

FIG. 7 depicts the display monitor unit's adaptability. FIG. 7 is a side view of display monitor unit 10, where base 12 is mounted to an under surface of a cabinet 70. Cabinet 70 may be found in a kitchen, laundry or utility room and may have a cabinet skirt or trim piece 72 protruding beyond the end of the cabinet. Attention is drawn to the fact that base 12 is a generally planar structure.

The display monitor in FIG. 7 includes a storage configuration which is the result of arm 14 being in stowed position 22'. In stowed position 22', the arm pivots such that arm 14 and screen 16 are flush with cabinet skirt 72, thereby obscuring the display monitor unit from view. However, in deployed position 22''', the arm is pivoted about axis B. Furthermore, the base may be pivoted about axis A, and the screen may be rotated about axis C to accommodate the orientation of the viewer. In the depicted embodiment, the display monitor unit is shown deployed at 22''', where arm 14 has been pivoted about axis B approximately 110 degrees.

The screen in the deployed position of FIG. 7 may accommodate a viewer who is standing or is positioned above the horizontal plane of the display screen unit's mounting. However, it is also contemplated that display monitor unit 10 may be mounted above a viewer with corresponding adjustments of arm 14 and base 12 possible. Moreover, if necessary, screen 16 may be rotated about axis C approximately 180 degrees so that a projection from the screen is in an apparent upright position to a viewer.

A similar example of the display monitor unit's adaptability is found by referring back to FIG. 3. In FIG. 3, display monitor unit 10 is mounted on vertical reference surface 18, such as a wall. Depending on the height of the mount, base 12 may be rotated about axis A to orient screen 16 either upwardly or downwardly. Arm 14 may be pivoted about axis B so as to angle screen 16 appropriately outwardly from the wall. Screen 16 may be rotated about axis C to change the orientation of the screen to accommodate the position of the viewer.

As a third example of adjustability and adaptability, display monitor unit 10 may be mounted upright on a table or other horizontal surface including a night stand as shown in FIG. 1. Again, base 12 may be rotated about axis A to position screen 16 toward a viewer. Arm 14 may also be deployed about axis B, while screen 16 may be rotated about axis C. Rotation of the screen 90 degrees about axis C from first base position 22' (FIG. 4) orients screen 16 sideways in reference to the room. However, to a recumbent viewer, with their head positioned sideways, screen 16 will be in an apparent upright screen position.

Accordingly, while the present invention has been shown and described with reference to the foregoing preferred embodiments, it will be apparent to those skilled in the art that other changes in form and detail may be made therein without departing from the spirit and scope of the invention as defined in the appended claims.

I claim:

1. A multi-positional display monitor unit mountable on a reference surface, the display monitor unit comprising:

a base with a recessed perimeter portion;

an arcuate arm with opposing ends and a crest, where the ends of the arcuate arm are attached to the base such that the arcuate arm can be pivoted between a stowed position where the arcuate arm folds into the recessed perimeter portion generally flush with the base and a deployed arm position where the arcuate arm projects from the base; and a display screen rotatably secured to the crest of the arcuate arm.

2. The display monitor unit of claim 1, where the base is circular.

3. The display monitor unit of claim 1, where the base includes a swivel portion adapted to rotate about a first axis that extends through the reference structure where the ends of the arcuate arm are attached to the swivel portion.

4. The display monitor unit of claim 1, where the arcuate arm, when in the deployed arm position, pivots outward from the base about a second axis which is parallel to the reference surface.

5. The display monitor unit of claim 1, where the display screen, when in the stowed position, lies generally flush against the reference surface.

6. The display monitor unit of claim 1, wherein the crest of the arcuate arm has a circular plate on which the display screen is rotatably secured.

7. The display monitor unit of claim 1, where the display screen is rotatable approximately 360 degrees about a third axis which extends through the display screen.

8. The display monitor unit of claim 1, where the display screen is rotatable approximately 270 degrees in one direction about a third axis that extends through the display screen and is rotatable approximately 90 degrees in the opposing direction about the third axis.

* * * * *